US 8,549,598 B2

(12) United States Patent
Tsujimoto

(10) Patent No.: US 8,549,598 B2
(45) Date of Patent: *Oct. 1, 2013

(54) MULTIFUNCTION APPARATUS, AUTHENTICATION SERVER, AND MULTIFUNCTION APPARATUS CONTROL SYSTEM

(75) Inventor: Kunihiko Tsujimoto, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 145 days.

This patent is subject to a terminal disclaimer.

(21) Appl. No.: 13/093,598

(22) Filed: Apr. 25, 2011

(65) Prior Publication Data

US 2011/0265167 A1    Oct. 27, 2011

(30) Foreign Application Priority Data

Apr. 26, 2010  (JP) ................................. 2010-101228

(51) Int. Cl.
  *H04L 29/06*    (2006.01)
(52) U.S. Cl.
  USPC ............... 726/7; 726/1; 726/2; 726/3; 726/4; 726/5; 726/6; 726/11; 726/12; 726/13; 726/21; 713/168; 713/169; 713/170; 713/175; 713/176; 713/182; 713/183; 713/184; 713/185; 713/186; 709/217; 709/219; 709/224; 709/225; 709/229; 358/1.15; 358/448; 358/468; 358/471
(58) Field of Classification Search
  USPC . 726/1–14, 21; 709/217–229; 713/168–186; 358/1.14, 1.15, 448, 468–471
  See application file for complete search history.

(56) References Cited

U.S. PATENT DOCUMENTS 6,313,921 B1 * 11/2001 Kadowaki .................... 358/1.15
2003/0043272 A1    3/2003 Nagao et al.

(Continued)

FOREIGN PATENT DOCUMENTS

CN        1495579 A      5/2004
CN     101115116 A      1/2008

(Continued)

OTHER PUBLICATIONS

The MFP solution by Endo et al; Publisher: OKI Technical Review; Date: Apr. 2004.*

(Continued)

*Primary Examiner* — Madhuri Herzog
(74) *Attorney, Agent, or Firm* — Edwards Wildman Palmer LLP; David G. Conlin; Edmund J. Koundakjian

(57) ABSTRACT

A multifunction apparatus 21 of the present invention communicates with an information processing apparatus 51 via a communication network 50. The multifunction apparatus 21 includes an apparatus control section 7, a second web server section 8, and a web browser section 5 which communicates with a first web server section 53 or the second web server section 8. The apparatus control section 7 transmits login information entered by a user to an authentication server 91. The web browser section 5 (i) accepts, from the first web server section 53, control information for informing the second web server section 8 of a control instruction to obtain user related information from the authentication server 91 and (ii) carries out an informing process in which the second web server section 8 is informed of the control instruction. The apparatus control section 7 obtains the user related information from the authentication server 91 in accordance with the control instruction received by the second web server section 8. The web browser section 5 transmits the user related information obtained by the apparatus control section 7 to the first web server section 53.

10 Claims, 8 Drawing Sheets

(56) References Cited

U.S. PATENT DOCUMENTS

| | | | |
|---|---|---|---|
| 2004/0054904 A1 | 3/2004 | Matsuya | |
| 2004/0075857 A1 | 4/2004 | Akiyoshi et al. | |
| 2004/0130747 A1 | 7/2004 | Ohishi et al. | |
| 2004/0205176 A1* | 10/2004 | Ting et al. | 709/223 |
| 2005/0046887 A1 | 3/2005 | Shibata et al. | |
| 2005/0108353 A1 | 5/2005 | Yamamoto | |
| 2006/0026434 A1* | 2/2006 | Yoshida et al. | 713/182 |
| 2006/0061813 A1 | 3/2006 | Kuroda et al. | |
| 2007/0159663 A1* | 7/2007 | Tsujimoto | 358/448 |
| 2007/0255428 A1* | 11/2007 | Nagata | 700/8 |
| 2008/0027569 A1 | 1/2008 | Okigami | |
| 2008/0098221 A1* | 4/2008 | Hashimoto et al. | 713/169 |
| 2008/0120408 A1 | 5/2008 | Kim | |
| 2008/0150952 A1 | 6/2008 | Koarai | |
| 2009/0091782 A1 | 4/2009 | Okamoto et al. | |
| 2010/0053676 A1* | 3/2010 | Sugimoto | 358/1.15 |
| 2010/0122319 A1 | 5/2010 | Nakashima | |
| 2011/0252117 A1* | 10/2011 | Sng et al. | 709/219 |

FOREIGN PATENT DOCUMENTS

| | | | |
|---|---|---|---|
| CN | 101237499 A | 8/2008 | |
| JP | 2004-086765 A | 3/2004 | |
| JP | 2003-69988 A | 10/2004 | |
| JP | 2005-080018 A | 3/2005 | |
| JP | 2005-149320 A | 6/2005 | |
| JP | 2006-092182 A | 4/2006 | |
| JP | 2006-135890 A | 5/2006 | |
| JP | 2006-252135 A | 9/2006 | |
| JP | 2007-134814 A | 5/2007 | |
| JP | 2007-174400 A | 7/2007 | |
| JP | 2007-208910 A | 8/2007 | |
| JP | 2008-083740 A | 4/2008 | |
| JP | 2008269530 A | 11/2008 | |
| JP | 2009-116890 A | 5/2009 | |
| JP | 2010113599 A | 5/2010 | |

OTHER PUBLICATIONS

Office Action dated Oct. 23, 2012 issued in U.S. Appl. No. 12/928,118.

U.S. Appl. No. 12/928,118, filed Dec. 2, 2010.

Office Action dated Feb. 5, 2013 issued in related U.S. Appl. No. 12/928,118.

Office Actiion dated May 9, 2013 issued in co-pending U.S. Appl. No. 12/928,118.

* cited by examiner

FIG. 5

```
<html>
 <body>
  <h2>DOCUMENT MANAGEMENT APPLICATION</h2>
  <form name="scan" method="post" action="scanstart.html">
   <p>WELCOME, Mr. TANAKA!<p/>
   <br>
   <p>SET DOCUMENT AND PRESS SCAN BUTTON.<p/>
   <div align="right"><input type="submit" value="SCAN"></div>
  </form>
 </body>
</html>
```

FIG. 6

DOCUMENT MANAGEMENT APPLICATION

WELCOME, Mr. TANAKA!

SET DOCUMENT AND PRESS SCAN BUTTON.

[ SCAN ]

FIG. 7

```
DOCUMENT MANAGEMENT APPLICATION

LOGIN NAME: [                    ]

MAIL ADDRESS: [                    ]

[ LOGIN ]  [ RESET ]
```

FIG. 9

```
HTTP/1.1 302 Found
Date: MON, 31 Aug 2009 12:00:00 GMT
Server.Apache/1.4 (Unix)
Location: http://123.123.123.123/app/default.html
Content-Type: text/html; charset=uft-8
```

MULTIFUNCTION APPARATUS, AUTHENTICATION SERVER, AND MULTIFUNCTION APPARATUS CONTROL SYSTEM

This Nonprovisional application claims priority under 35 U.S.C. §119(a) on Patent Application No. 2010-101228 filed in Japan on Apr. 26, 2010, the entire contents of which are hereby incorporated by reference.

TECHNICAL FIELD

The present invention relates to a multifunction apparatus control system in which a multifunction apparatus, an authentication server, and an information processing apparatus work together.

BACKGROUND ART

There has been demand for unifying authentication processes into a single authentication process, i.e. demand for employing single sign-on, in a system in which a multifunction apparatus works with a plurality of services and applications (hereinafter, referred to as "external application"), provided on a network.

Patent Literature 1 discloses a technique in which (i) authentication information that is entered into a digital multifunction apparatus and authentication information for an external application server with which the digital multifunction apparatus communicates are stored so that these are associated with each other and (ii), in a case where the external application server is used after authentication is completed on the digital multifunction apparatus, authentication is carried out by use of the authentication information for the external server, which has been associated with the authentication information entered into the digital multifunction apparatus.

CITATION LIST

Patent Literature

Patent Literature 1
Japanese Patent Application Publication, Tokukai, No. 2008-83740 A (Publication Date: Apr. 10, 2008)

SUMMARY OF INVENTION

Technical Problem

However, according to Patent Literature 1, user information, such as the authentication information, is stored in the digital multifunction apparatus. This gives rise to such a problem that a user has to register and update the user information for each digital multifunction apparatus. Particularly, as the number of the digital multifunction apparatuses sharing an authentication server and/or the number of the external applications used by each digital multifunction apparatus increases, a maintenance cost becomes high.

Further, a plurality of external applications do not necessarily employ an unified authentication process. In a case where a plurality of external applications are used in combination with each other but their authentication processes are different from each other, it is necessary to store, for each of the plurality of external applications, customized user information or the like in the digital multifunction apparatus. Furthermore, it is necessary for the digital multifunction apparatus to manage which external applications requires which piece of user information. It is inconvenient for the user to carry out such management.

The present invention is made in view of the conventional problems. An object of the present invention is to provide a multifunction apparatus which easily allows single sign-on without storing, for each user, user information in the multifunction apparatus, even in a case where required user information differs between external applications.

Solution to Problem

In order to attain the object, a multifunction apparatus which communicates with, via a communication network, an information processing apparatus including a first web server section which operates in accordance with software of a web server, the multifunction apparatus working with an application which operates on the web server so as to carry out a cooperation process, includes: an authentication control section which communicates with an authentication server that (i) carries out an authentication process for authenticating a user who operates the multifunction apparatus and (ii) stores, for each user, user related information which is related to the each user and is used when the multifunction apparatus carries out the cooperation process with the application; a second web server section which operates in accordance with software of the web server; and a web browser section which communicates with the first web server section or the second web server section in accordance with software of a web browser, the authentication control section (i) controlling the authentication server to carry out the authentication process by transmitting login information, entered by a user, to the authentication server and (ii) storing the login information, the web browser section (i) accepting, from the first web server section, control information for informing the second web server section of a control instruction to obtain the user related information from the authentication server and (ii) carrying out an informing process, in which the second web server section is informed of the control instruction, on receipt of the control information from the first web server section, the authentication control section obtaining, from the authentication server, the user related information in accordance with the control instruction received by the second web server section, the user related information corresponding to the user indicated by the login information stored in the authentication control section, and the web browser section transmitting the user related information obtained by the authentication control section to the first web server section.

According to the arrangement, the authentication control section controls the authentication server to carry out the authentication process by transmitting the entered login information to the authentication server. Further, when the cooperation process is carried out, the web browser section (i) accepts, from the first web server section, the control information contains the control instruction to obtain the user related information from the authentication server and (ii) carries out the informing process in which the second web server section is informed of the control instruction. Then, the web browser section transmits the user related information obtained from the authentication server to the first web server section. According to the arrangement, the multifunction apparatus 21 (i) obtains the user related information requested by the first web server section from the authentication server and (ii) transmits the user related information to the first web server section in response to the request. Therefore, the information processing apparatus can authenticate the user by use of the user related information.

This makes it possible to provide a multifunction apparatus which allows a user to easily execute single sign-on without multifunction apparatus storing user information for each user, even in a case where requested user information differs between external applications.

Further, according to the arrangement, the authentication control section can receive the control instruction from the second web server section of the multifunction apparatus, instead of receiving it from the first web server section of the information processing apparatus. Since the authentication control section and the second web server section are provided in the same multifunction apparatus, no firewall is provided between the authentication control section and the second web server section. Accordingly, even if the firewall is provided in the communication network via which the multifunction apparatus and the information processing apparatus communicate with each other, (i) the multifunction apparatus can communicate with the authentication server and (ii) the information processing apparatus can control the corresponding one of the functions of the multifunction apparatus.

Advantageous Effects of Invention

As described above, a multifunction apparatus of the present invention, which communicates with, via a communication network, an information processing apparatus including a first web server section which operates in accordance with software of a web server, the multifunction apparatus working with an application which operates on the web server so as to carry out a cooperation process, includes: an authentication control section which communicates with an authentication server that (i) carries out an authentication process for authenticating a user who operates the multifunction apparatus and (ii) stores, for each user, user related information which is related to the each user and is used when the multifunction apparatus carries out the cooperation process with the application; a second web server section which operates in accordance with software of the web server; and a web browser section which communicates with the first web server section or the second web server section in accordance with software of a web browser, the authentication control section (i) controlling the authentication server to carry out the authentication process by transmitting login information, entered by a user, to the authentication server and (ii) storing the login information, the web browser section (i) accepting, from the first web server section, control information for informing the second web server section of a control instruction to obtain the user related information from the authentication server and (ii) carrying out an informing process, in which the second web server section is informed of the control instruction, on receipt of the control information from the first web server section, the authentication control section obtaining, from the authentication server, the user related information in accordance with the control instruction received by the second web server section, the user related information corresponding to the user indicated by the login information stored in the authentication control section, and the web browser section transmitting the user related information obtained by the authentication control section to the first web server section.

Therefore, it is possible to provide a multifunction apparatus which allows a user to easily execute single sign-on without the multifunction apparatus storing user information for each user, even if requested user information differs between external applications.

BRIEF DESCRIPTION OF DRAWINGS

FIG. 5 is a view showing an example of HTML data of an initial operation screen, which HTML data is transmitted in S30 shown in FIG. 4.

FIG. 6 is a view showing an example of an initial operation screen displayed in S31 shown in FIG. 4.

FIG. 7 is a view showing an example of a user information input screen.

FIG. 9 is a view showing an example of redirect data transmitted in S48 shown in FIG. 8.

DESCRIPTION OF EMBODIMENTS

One embodiment of the present invention is described below with reference to FIGS. 1 through 10. The following descriptions deal with one embodiment of a multifunction apparatus control system of the present invention.

Figure 1:
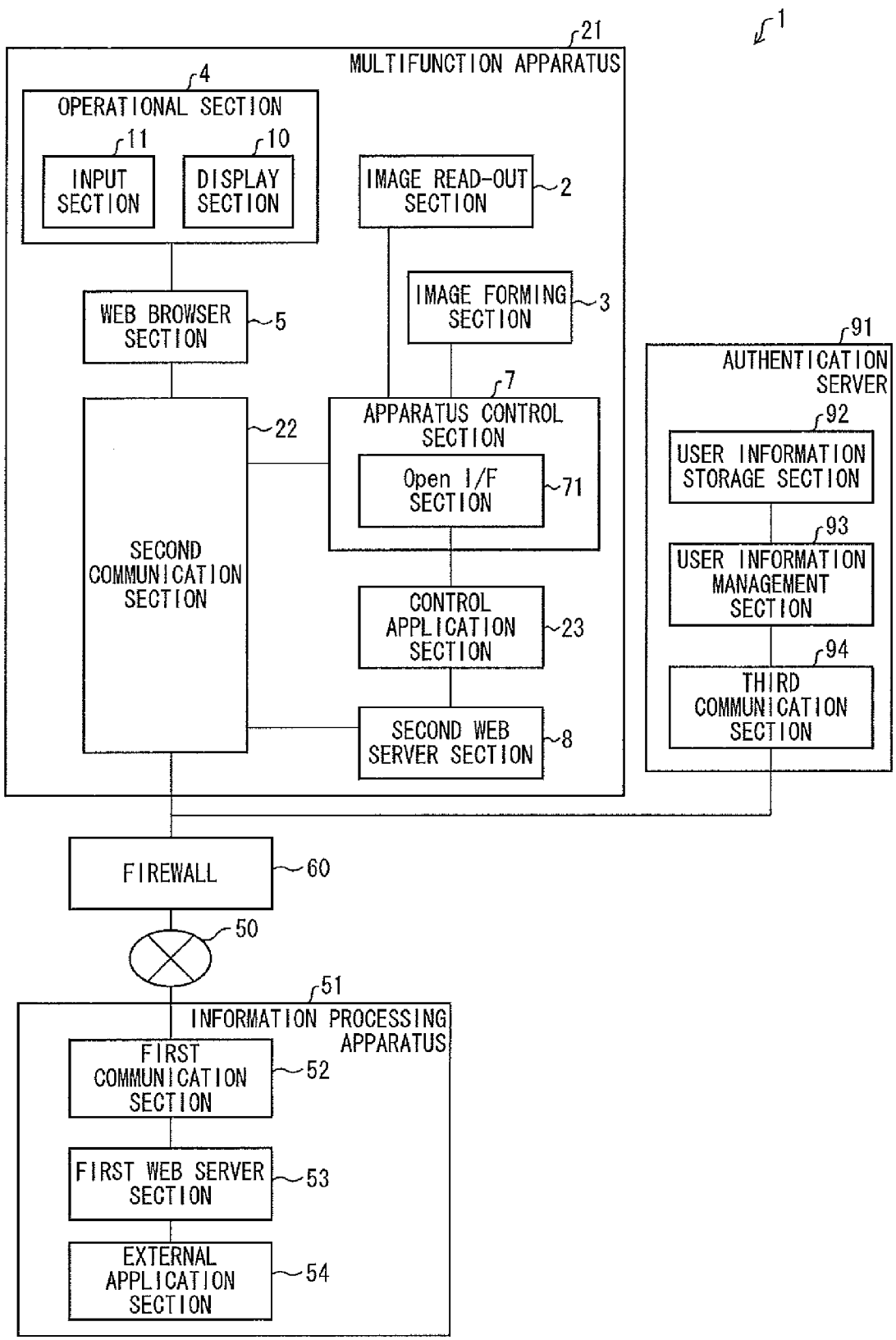
FIG. 1 is a block diagram illustrating an arrangement of a multifunction apparatus control system of the present embodiment.

FIG. 1 is a block diagram illustrating an arrangement of a multifunction apparatus control system 1 of the present embodiment. The multifunction apparatus control system 1 of the present embodiment includes a multifunction apparatus 21, an authentication server 91, and an information processing apparatus 51 (see FIG. 1). The multifunction apparatus 21, the authentication server 91, and the information processing apparatus 51 communicate with one another via a communication network 50. Note that, in the multifunction apparatus control system 1, (i) a plurality of multifunction apparatuses 21 can be provided instead of a single multifunction apparatus 21 and (ii) a plurality of information processing apparatuses 51 can be provided instead of a single information processing apparatus 51.

Examples of the communication network 50 encompass the Internet, a telephone line, a serial cable, and other wired/wireless communication lines.

The multifunction apparatus 21 and the authentication server 91 communicate with each other by use of, for example, an LDAP (Light Directory Access Protocol). Further, the multifunction apparatus 21 and the information processing apparatus 51 communicate with each other by use of, for example, an HTTP (Hyper Text Transfer Protocol) which is a protocol used in a communication (e.g. a request for a web page and transmission of the web page) between a web server and a web browser. Note that the multifunction apparatus 21 and the authentication server 91 can alternatively communicate with each other by use of the HTTP.

[Configuration of Multifunction Apparatus 21]

First, the following description deals with the multifunction apparatus 21. The multifunction apparatus 21 can carry out various functions such as a scanning function, a printing function, a facsimile transceiving function, and a function of transmitting image data.

Further, the multifunction apparatus 21 employs an inherent operation mode and a cooperation mode. According to the inherent operation mode, the multifunction apparatus 21 (i) causes a display section 10 to display an operation screen which is stored in the multifunction apparatus 21 in advance, (ii) receives, from an input section 11, an instruction entered via the operation screen, and (iii) carries out the various functions in accordance with the instruction. According to the cooperation mode, the multifunction apparatus 21 (i) causes the display section 10 to display an operation screen received from the information processing apparatus 51, (ii) works with an application of the information processing apparatus 51, and (iii) carries out the various functions in response to a control instruction which is prepared by a control application in accordance with an instruction entered via the operation screen.

The multifunction apparatus 21 receives HTML (Hyper-Text Markup Language) control information by use of the HTTP, in a cooperation process in which the multifunction apparatus 21 communicates with an external apparatus such as the information processing apparatus 51. Then, the multifunction apparatus 21 carries out various functions of the multifunction apparatus 21 in accordance with the HTML control information.

For example, the multifunction apparatus 21 (i) receives HTML data indicating an operation screen from the information processing apparatus 51 and (ii) causes the operation screen indicated by the HTML data to be displayed. Then, the multifunction apparatus 21 carries out various functions in accordance with an instruction entered via the operation screen.

Alternatively, the multifunction apparatus 21 can carry out various functions, such as a function of acquiring user information and a communicating function, by executing a control command which (i) is described in a Java (registered trademark) script and (ii) is included in control information received from the information processing apparatus 51.

The multifunction apparatus 21 includes an operational section 4, an image scanning section 2, an image forming section 3, a web browser section 5, a second communication section 22, an apparatus control section (authentication control section) 7, a second web server section 8, and a control application section 23 (see FIG. 1).

The operational section 4 is a user interface via which (i) the user is provided with various information and (ii) the user enters inputs. The operational section 4 includes (i) the display section 10 such as a liquid crystal display and (ii) the input section 11 having various input keys. Note that the operational section 4 can be a touch panel in which a display section 10 and an input section 11 are provided integrally.

The image scanning section 2 includes a scanner and a sheet feeding section which feeds a sheet to the scanner. The image scanning section 2 scans, as image data, objects such as characters and images. The image scanning section 2 scans an image so that a scanned image has a predetermined resolution.

The image forming section 3 is provided for printing an image (character/photograph/graphic) on a recording sheet such as paper in accordance with inputted image data. The image forming section 3 includes a photoreceptor drum, a charging device, an exposure device, a developing device, a transfer device, a fixing device, and a sheet tray.

The second communication section 22 is an interface via which the multifunction apparatus 21 communicates with an external device such as the information processing apparatus 51 or the authentication server 91. According to the present embodiment, the second communication section 22 (i) communicates with the authentication server 91 by use of the LDAP or the like and (ii) communicates with the information processing apparatus 51 by use of the HTTP or the like, as early described. Further, the second communication section 22 can access the second web server section 8 of the multifunction apparatus 21 in a case where an access destination is set to an IP address of the multifunction apparatus 21 itself.

The web browser section 5 operates in accordance with widely-used software of a web browser. The web browser section 5 can communicate with, via the second communication section 22, not only a first web server section 53 of the information processing apparatus 51 but also the second web server section 8 of the multifunction apparatus 21.

According to the present embodiment, the web browser section 5 communicates with the first web server section 53 of the information processing apparatus 51 in a case where (i) transmission of data of the operation screen or transmission of print data is requested and (ii) no control command for controlling a corresponding one of the various functions such as the scanning function and the printing function of the multifunction apparatus 21 is executed. On the other hand, the web browser section 5 communicates with the second web server section 8 of the multifunction apparatus 21 in a case where a control command for controlling a corresponding one of the various functions of the multifunction apparatus 21 is executed.

The second web server section 8 operates in accordance with widely-used software of a web server. The second web server section 8 receives a request (HTTP request) from the web browser section 5, and then making a response (HTTP response) to the web browser section 5 by executing an application for the request.

The control application section 23 carries out a process in accordance with a web application which operates on the web server. The web application is a custom application described in, for example, the Java (registered trademark) script, and operates in a Java (registered trademark) script execution environment provided on the web server.

The control application section 23 transmits a control command for controlling a corresponding one (e.g. a function of acquiring login information) of the various functions of the multifunction apparatus 21 to the apparatus control section 7, in a case where the corresponding one of the various functions of the multifunction apparatus 21 needs to be controlled. This allows the corresponding one of the various functions of the multifunction apparatus 21 to be controlled.

The apparatus control section 7 controls various functions of the multifunction apparatus 21. Specifically, the apparatus control section 7 controls each operation of the image scanning section 2, the image forming section 3, the second communication section 22, the operational section 4, and the web browser section 5.

The apparatus control section 7 controls the authentication server 91 to carry out an authentication process by transmitting login (authentication) information to the authentication server 91, when the login information is entered via the input section 11.

Further, the apparatus control section 7 stores the login information entered via the input section 11 in a case where the apparatus control section 7 receives, from the authentication server 91, an authenticated result which indicates that the authentication was successful.

Furthermore, the apparatus control section 7 controls the web browser section 5 to start up and carry out a process in accordance with a predetermined URL (according to the present embodiment, a URL which requests the first web server section 53 of the information processing apparatus 51 to transmit an initial operation screen to the multifunction apparatus 21), in a case where an instruction to carry out the cooperation process is entered. In the cooperation process, the apparatus control section 7 accepts a control command from the control application section 23, and carries out the control in accordance with the control command.

The apparatus control section 7 further includes an Open I/F section 71 which can accept a control command irrespective of a type of the multifunction apparatus 21. The Open I/F section 71 publishes control commands for controlling the various functions of the multifunction apparatus 21 with respect to the control application section 23. The Open I/F section 71 receives a control command from the control application section 23, and then converts the control command into a command which the apparatus control section 7 can recognize.

The Open I/F section 71 includes a conversion table storage section (not illustrated) for storing a conversion table in which control commands published to the outside are associated with the respective commands that can be recognized by the apparatus control section 7. The Open I/F section 71 carries out the conversion of the command in accordance with the conversion table.

As described above, the Open I/F section 71 can accept a common control command regardless of what type of the multifunction apparatus 21 is employed. Accordingly, it is possible to use a common web application which causes the control application section to operate, regardless of what type of the multifunction apparatus 21 is employed. Therefore, in a case where the control application section 23 is operated in accordance with a new web application, it is merely necessary to install the same web application on each of the plurality of multifunction apparatuses 21. That is, it is unnecessary to change each web application for a corresponding one of the plurality of multifunction apparatuses 21. It is therefore possible to easily develop the web application for operating the control application section 23.

[Configuration of Authentication Server 91]

Next, the following description deals with the authentication server 91. The authentication server 91 is a computer device constituted by (i) an arithmetic processing section such as a CPU or a special purpose processor and (ii) a storage section such as an RAM, a ROM, or an HDD. The authentication server 91 functions as an authentication apparatus that is shared by a plurality of multifunction apparatuses 21.

The authentication server 91 includes a user information storage section 92, a user information management section 93, and a third communication section 94 (see FIG. 1).

The third communication section 94 is an interface which communicates with an external device such as the multifunction apparatus 21. According to the present embodiment, the third communication section 94 communicates with the multifunction apparatus 21 by use of the LDAP or the like, as described above.

The user information management section 93 (i) obtains the login information which is received from the multifunction apparatus 21 and (ii) carries out an authentication process by checking whether or not the login information matches user registration information registered on the user information storage section 92 in advance. Then, the user information management section transmits an authenticated result to the multifunction apparatus 21.

The user information storage section 92 stores user registration information for each user in advance. The user information storage section 92 stores (i) first user information (e.g. a login name and a password) used in the authentication process, which is carried out when the user start operating the multifunction apparatus and (ii) second user information used in the cooperation process in which the multifunction apparatus 21 and an application of the information processing apparatus 51 work together. Examples of the second user information encompass a user ID, a user name, and a user's mail address.

[Configuration of the Information Processing Apparatus 51]

Next, the following description deals with the information processing apparatus 51. The information processing apparatus 51 is a computer device constituted by (i) an arithmetic processing section such as a CPU or a special purpose processor and (ii) a storage section such as the RAM, the ROM, or the HDD. The information processing apparatus 51 functions as a web server device shared by a plurality of multifunction apparatuses 21.

The information processing apparatus 51 includes a first communication section 52, the first web server section 53, and an external application section 54 (see FIG. 1).

The first communication section 52 is an interface which communicates with an external device such as the multifunction apparatus 21 via the Internet or a LAN. According to the present embodiment, the first communication section 52 communicates with the multifunction apparatus 21 by use of the HTTP or the like, as described above.

The first web server section 53 operates in accordance with software of the web server. Here, the web server is software which provides a function of a server device that constitutes "WWW (World Wide Web)" which is an information system on the Internet. The first web server section 53 has a function of (i) receiving a request (i.e., the HTTP request) from the multifunction apparatus 21 via the first communication section 52 and (ii) responding to the request by transmitting, to the multifunction apparatus 21 via the first communication section 52, image data and/or control information in accordance with the HTTP request.

The external application section 54 is a block for carrying out an operation, which is in accordance with a predetermined web application, in response to an instruction received from the first web server section 53. That is, the external application section 54 carries out each operation in accordance with a corresponding one of various web applications which operate on the web server. Such web applications are respective custom applications described in, for example, the Java (registered trademark) script, and operate in the Java (registered trademark) script execution environment.

In a case where, for example, the information processing apparatus 51 receives, from the multifunction apparatus 21, a request (HTTP request) for transmission of an operation screen, the external application section 54 carries out an operation in accordance with an application for transmitting the operation screen. Specifically, the external application section 54 (i) reads out from the storage section the HTML data indicating the operation screen which the multifunction apparatus 21 requested to receive and (ii) transmits the HTML data to the first web server section 53.

[Flow of Authentication Process]

Figure 2:
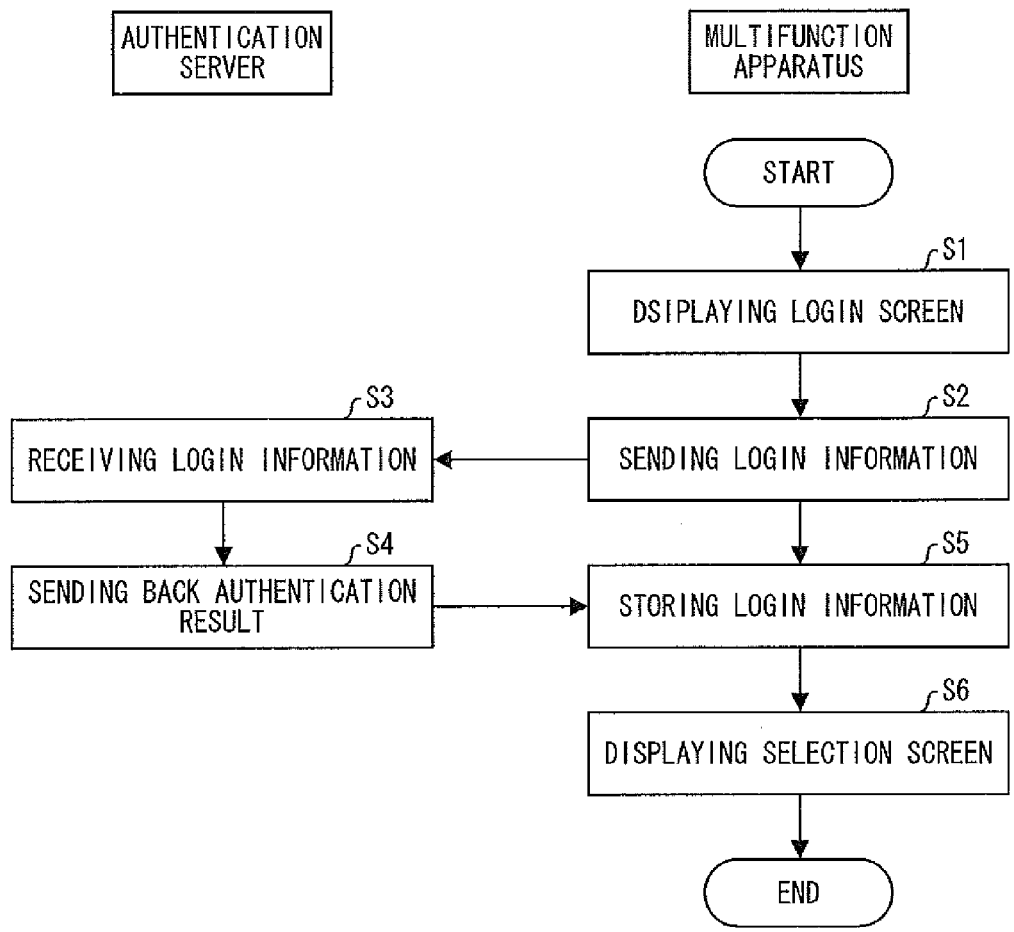
FIG. 2 is a flowchart showing how an authentication process is carried out.

Next, the following description deals with how the multifunction apparatus 21 and the authentication server 91 work together to carry out the authentication process when the user logs in the multifunction apparatus 21, with reference to FIG. 2. FIG. 2 is a flowchart showing how the authentication process is carried out.

When the multifunction apparatus 21 is turned on, the apparatus control section 7 controls the display section 10 to display a login screen (S1).

Figure 3:
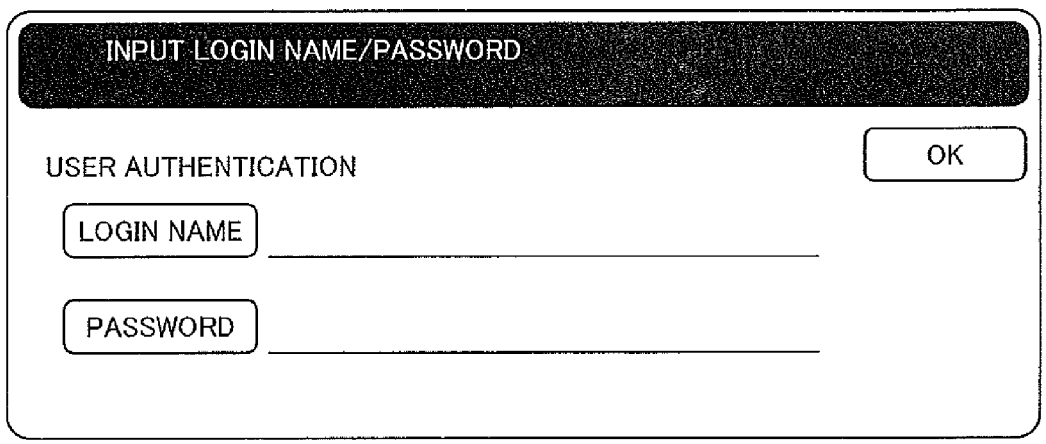
FIG. 3 is a view showing an example of a login screen displayed by a multifunction apparatus.

FIG. 3 illustrates an example of the login screen displayed on the display section 10 of the multifunction apparatus 21. The login information such as a login name and a password can be entered via the login screen (see FIG. 3). In a case where (i) the login name and the password are entered via the login screen and (ii) an "OK" button is pressed, the apparatus control section 7 transmits the login information to the authentication server 91 via the second communication section 22 (S2). Alternatively, the login information can be entered by use of an IC (Integrated Circuit) card or the like.

On receipt of the login information from the multifunction apparatus 21 (S3), the user information management section 93 of the authentication server 91 carries out the authentication process by checking whether or not the login information matches the user registration information (here, the first user information) registered on the user information storage section 92 in advance. Then, the user information management section 93 sends back a result of the authentication to the multifunction apparatus 21 (S4).

On receipt of the result of the authentication from the authentication server 91, the apparatus control section 7 analyzes the result of the authentication. In a case where the analysis shows that the authentication was successful, the apparatus control section 7 stores the login information entered via the input section 11 (S5). Then, the apparatus control section 7 controls the display section 10 to display a screen such as a selection screen via which one of the functions of the multifunction apparatus 21 can be selected (S6).

On the other hand, in a case where the analysis shows that authentication was unsuccessful, the apparatus control section 7 controls the display section 10 to display, on the login screen, information which urges the user to reenter the login information.

[Flow of User Information Acquisition Process]

Next, the following description deals with in detail how the user information acquisition process is carried out. The user information acquisition process is carried out in the cooperation process after it is judged that the authentication was successful. The multifunction apparatus 21, the information processing apparatus 51, and the authentication server 91 work together so as to carry out the user information acquisition process.

In order for external applications to be used in the cooperation process, control of the multifunction apparatus 21 may be carried out so that (i) an authentication process is required per external application in addition to the authentication process in the multifunction apparatus 21 and (ii) an external application can be used only in a case where the authentication process for such an external application was successful. In this case, it is preferable to omit the authentication process for each of the external applications by use of the login information used in the foregoing authentication process in the multifunction apparatus 21 (single sign-on).

Further, in some external applications, information (e.g. a user name and/or a mail address), other than the information used in the foregoing authentication process in the multifunction apparatus 21, is used in their respective authentication processes. Even in such a case, it is preferable to omit the user's input for an authentication process in an external application, provided that the authentication process, which was carried out for the user's operation, was successful. Such omission of the authentication in each of the external applications allows an improvement in user convenience.

Accordingly, an operation screen customized to each user can be displayed on the display section 10 instead of the login screen, in a case where (i) the multifunction apparatus 21 requests the information processing apparatus 51 to transmit a login screen of an external application, (ii) the information processing apparatus 51 obtains, from the multifunction apparatus 21, user information that is required for the authentication process in such an external application, and (iii) it is determined that the authentication process in the external application was successful by use of the user information.

Further, it is also possible to control the display section 10 to display the login screen in accordance with the request for the login screen which is made by the multifunction apparatus 21, in a case where (i) the user information was incorrect or (ii) the login information itself could not obtained because the authentication function of the multifunction apparatus 21 is nullified.

According to the present embodiment, in a case of obtaining the user information of the user who has logged into the multifunction apparatus 21, the external application section 54 transmits, to the web browser section 5 of the multifunction apparatus 21, an HTTP response for changing the access destination of the web browser section 5 to the second web server section 8 of the multifunction apparatus 21. This allows the multifunction apparatus 21 to control the various functions in accordance with the control command received from the control application section 23 of the multifunction apparatus 21, not in accordance with the control command received from the information processing apparatus 51 including the external application section 54.

Therefore, even if there is provided a firewall 60, which blocks a communication of the control command, between the multifunction apparatus 21 and the information processing apparatus 51, then the multifunction apparatus 21 can respond to the user information acquisition request received from the information processing apparatus 51.

For example, the external application section 54 embeds a script in the HTML data of an initial operation screen that is to be transmitted to the multifunction apparatus 21. The script causes a process for obtaining necessary user information to be carried out before the initial operation screen is displayed. It is described in the script that the second web server section 8 of the multifunction apparatus 21 should be accessed by use of a loopback address. The loopback address is a virtual IP address allocated to a loopback interface such as a network card (such as hardware carrying out a function of the communication section), i.e., an IP address of the multifunction apparatus 21 itself. Note that the loopback address is a well-known address used in a widely-used web browser.

Alternatively, the external application section 54 can transmit, to the multifunction apparatus 21, a response (HTTP response) employing an HTTP redirect, which response contains an instruction to change the URL so that the second web server section 8 of the multifunction apparatus 21 is to be accessed. The HTTP redirect is a sort of response received from the web server in the HTTP that is used to send/receive data. The HTTP redirect is a function of informing that the URL has been changed. Note that the HTTP redirect is a well-known function used in a widely-used web browser.

The following description deals with a concrete example of how the user information acquisition process is carried out in the multifunction apparatus control system 1 of the present embodiment.

Concrete Example 1

Figure 4:
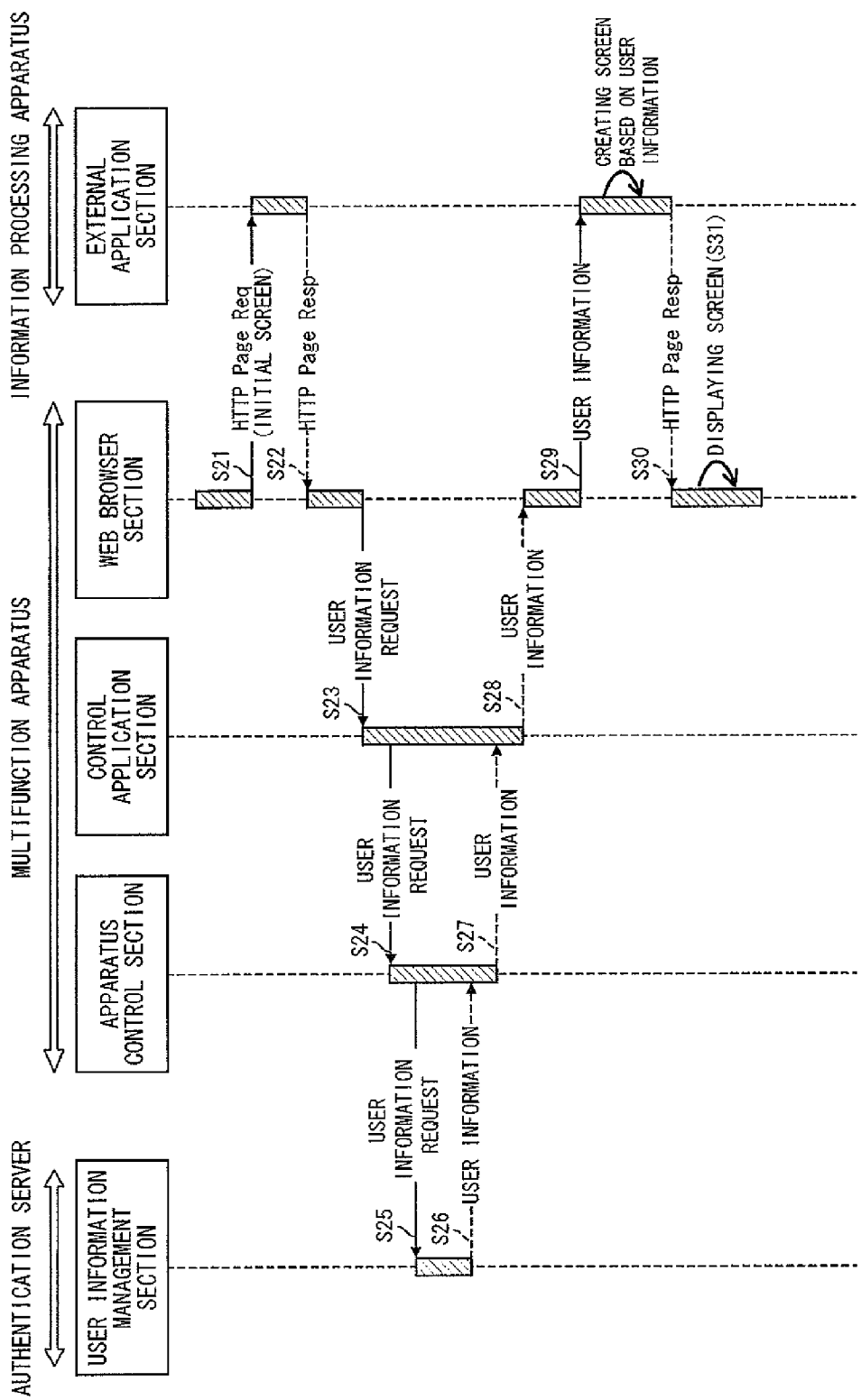
FIG. 4 is a view showing how a user information acquisition process of Concrete Example 1 is carried out.

How the User Information Acquisition Process is Carried Out when the Loopback Address is Used FIG. 4 is a view showing how the user information acquisition process of the present concrete example is carried out. First, an instruction to start up the cooperation process is entered via the input section 11 on the selection screen displayed in S6 shown in FIG. 2. Then, in a case where an external application is selected, the apparatus control section 7 controls the web browser section 5 to start up. The web browser section 5 accesses the information processing apparatus 51 in accordance with a predetermined initial URL so as to transmit, to the information processing apparatus 51, an HTTP Get command for requesting an initial operation screen of the external application selected by the user (S21).

In response to the HTTP Get command received from the multifunction apparatus 21, the external application section 54 (i) identifies user information which is necessary to log into the external application corresponding to the HTTP Get command and (ii) transmits, to the multifunction apparatus 21, an HTML data of the initial operation screen, which HTML data contains the Java (registered trademark) script that requests the multifunction apparatus 21 to acquire such user information (hereinafter, referred to as "user information acquisition request") (S22).

On receipt of the HTML data of the initial operation screen, which HTML data contains the user information acquisition request, the web browser section accesses the second web server section 8 of the multifunction apparatus 21 by executing the Java (registered trademark) script for causing the control command to be generated. Then, the web browser section 5 informs the second web server section 8 of the user information acquisition request. Note that the web browser section 5 informs the second web server section 8 of the user information acquisition request without causing the initial operation screen to be displayed based on the HTML data received in S22. Accordingly, at this point, the web browser section 5 does not cause the display section 10 to display the initial operation screen on the basis of the HTML data received from the information processing apparatus 51.

In accordance with the user information acquisition request received from the web browser section 5, the second web server section 8 requests the control application section 23 to carry out a process for acquiring the user information (S23). In response to the request, the control application section 23 (i) cerates a control command to acquire the user information and (ii) transmits the control command to the apparatus control section 7 (S24). Note that the control application section 23 creates a control command to acquire the user information in accordance with an acquisition condition in a case where the HTTP request of the user information acquisition request contains such an acquisition condition for the target user information (such as a mail address or an affiliation).

On receipt of the control command from the control application section 23, the apparatus control section 7 judges whether or not the user information which the control command requests to acquire, i.e., a target of the user information acquisition request, is contained in the login information that has been stored in S5 shown in FIG. 2.

In a case where it is determined that the user information is contained in the login information, the apparatus control section 7 transmits, as the user information, the login information stored in S5 to the control application section 23 (S27). In a case where, for example, the target of the user information acquisition request is the login name, the apparatus control section 7 can immediately transmit, to the control application section 23, the login name because the login name has already been stored in the apparatus control section 7 in S5.

In contrast, in a case where the user information is not contained in the login information, the apparatus control section 7 accesses and requests the authentication server 91 by use of the login information stored in S5 so as to acquire, from the authentication server 91, the user information corresponding to the user information acquisition request (S25). In a case where, for example, the requested user information is a pair of the login name and the mail address, the apparatus control section 7 can immediately transmit, to the control application section 23, the login name that has been already stored in the apparatus control section in S5 but cannot immediately transmit the mail address to the control section 7. This is because the apparatus control section 7 has not stored the mail address in S5. Therefore, the apparatus control section 7 requests the authentication server 91 to transmit a mail address to the multifunction apparatus 21, which mail address has been stored in the user information storage section 92 so that the login name and the mail address are associated with each other.

In accordance with the user information acquisition request received from the apparatus control section 7, the authentication server 91 transmits the requested user information to the apparatus control section 7 (S26).

On receipt of the user information from the authentication server 91, the apparatus control section 7 responds to the user information acquisition request received in S24 by transmitting the user information obtained from the authentication server 91 to the control application section 23 (S27). The control application section 23 responds to the user information acquisition request received in S23 by transmitting the user information obtained from the apparatus control section 7 to the web browser section 5 (S28).

The web browser section 5 transmits the user information to the external application section 54 in accordance with the Java (registered trademark) script (see S22) contained in the HTML data of the initial operation screen (S29). On receipt of the user information from the web browser section 5, the external application section 54 (i) creates the HTML data of the initial operation screen on the basis of the obtained user information and (ii) transmits the created HTML data to the web browser section 5 (S30).

Then, the web browser section 5 (i) combines the HTML data of the initial operation screen, which HTML data is obtained in S22, with the HTML data of the initial operation screen, which HTML data is based on the user information and is obtained in S30 and (ii) controls the display section 10 to display an initial operation screen in accordance with the user (S31).

FIG. 5 is a view showing an example of the HTML data of the initial operation screen, which HTML data is transmitted in S30. FIG. 6 is a view showing an example of the initial operation screen which is displayed in S31. In S31, it is possible to control the display section 10 to display each initial operation screen, including the user name and the like, for a corresponding user on the basis of the user information received from the authentication server 91 (see FIGS. 5 and 6).

The web browser section 5 transmits the user information to the external application section 54 in S29. Note, however, that, in a case where the HTML data of the initial operation screen, obtained in S22, contains a Java (registered trademark) script for updating the initial operation screen on the basis of the user information obtained in S28, it is possible to (i) omit both S29 and S30 and (ii) control the display section 10 to display a combined initial operation screen which is prepared by combining HTML data in accordance with the user.

Further, the following cases (i) and (ii) can be assumed: (i) a case where the apparatus control section 7 cannot access the authentication server 91; and (ii) a case where the user information requested by the external application section 54 is not stored in the authentication server 91. In either case, the external application section 54 cannot obtain, from the authentication server 91, the user information which the external application section 54 has requested the authentication server 91 to transmit. In this regard, the apparatus control section 7 controls the display section to display a user information input screen which urges the user to enter the requested user information via the user information input screen.

FIG. 7 is a view showing an example of the user information input screen. As shown in FIG. 7, the apparatus control section 7 can control the display section 10 to display the user information input screen so as to urge the user to enter the requested user information.

Note that the information processing apparatus 51 can transmit, to the multifunction apparatus 21, not only the user information acquisition request but also, for example, an acquisition request for acquiring a mail address of a login user or an acquisition request for acquiring mail addresses of respective employees who belong to the same department as that of the user. This makes it possible for the information processing apparatus 51 to obtain various information, such as a destination of data transmission, from the authentication server 91.

Concrete Example 2

How the User Information Acquisition Process is Carried Out when HTTP Redirect is Used In the foregoing Concrete Example 1, (i) the external application section 54 of the information processing apparatus 51 transmits the HTML data containing the Java (registered trademark) script which requests the acquisition of the user information and (ii) the web browser section 5 accesses the second web server section 8 of the multifunction apparatus 21 on the basis of the Java (registered trademark) script.

Note, however, that the external application section 54 can be configured so that the web browser section 5 accesses the second web server section 8 of the multifunction apparatus 21 by use of the HTTP redirect function, instead of employing the Java (registered trademark) script. The present concrete example exemplifies a process for obtaining the user information by use of the HTTP redirect.

Figure 8:
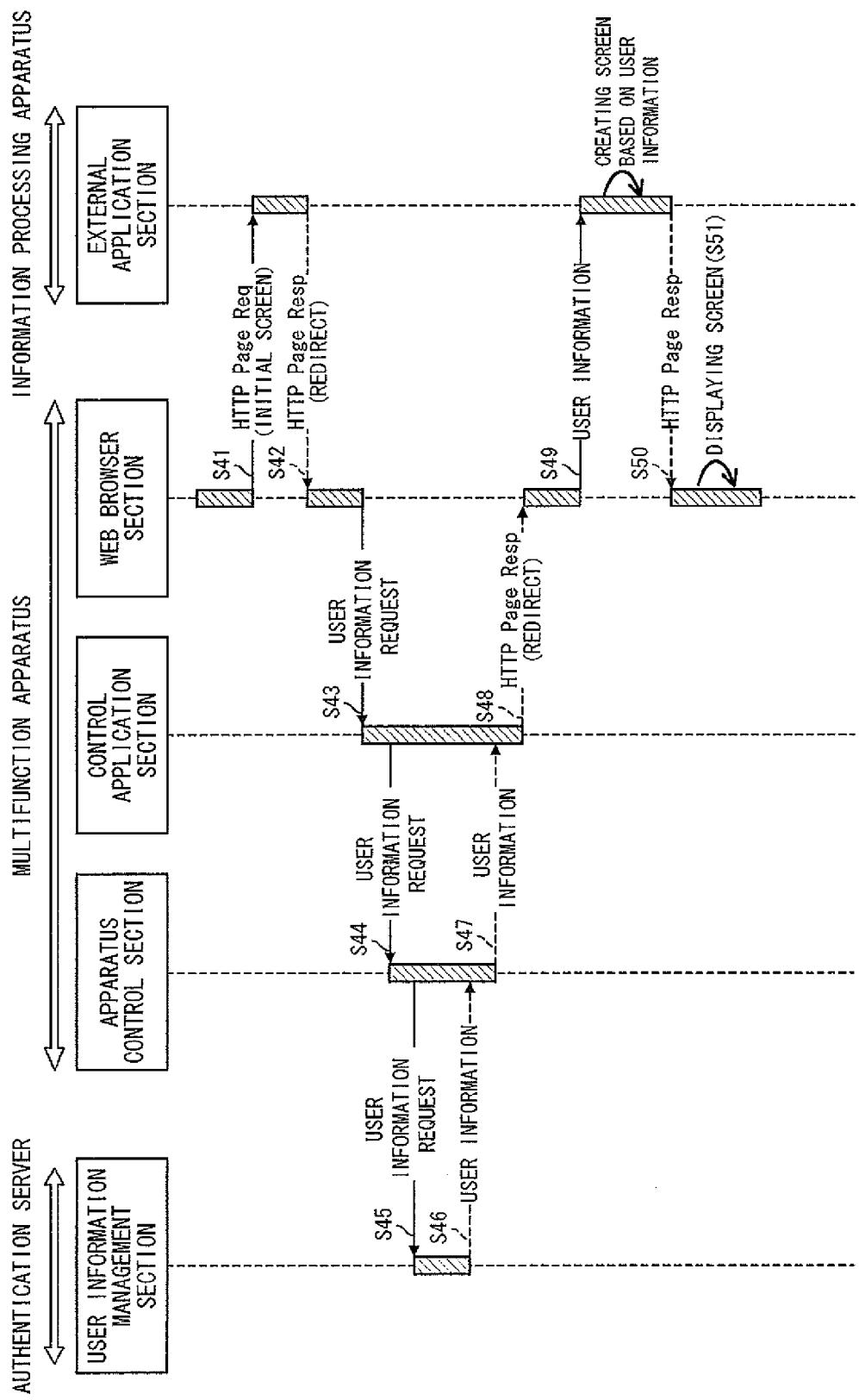
FIG. 8 is a view showing how a user information acquisition process of Concrete Example 2 is carried out.

FIG. 8 is a view showing how the user information acquisition process is carried in the present concrete example. First, a start-up instruction to start up the cooperation process is entered into the input section 11 while the selection screen is displayed in S6 shown in FIG. 2. Then, in a case where an external application is selected, the apparatus control section 7 causes the web browser section 5 to start up. Then, the web browser section 5 (i) accesses the information processing apparatus 51 in accordance with a predetermined initial URL and (ii) transmits, to the information processing apparatus 51, an HTTP Get command for requesting an initial operation screen of the external application that is selected by the user (S41).

On receipt of the HTTP Get command from the multifunction apparatus 21, the first web server section 53 instructs the external application section 54 to create HTML data of the initial operation screen in accordance with the HTTP Get command.

Then, the external application section 54 (i) causes the access destination to be changed to the second web server section 8 of the multifunction apparatus 21 by use of the HTTP redirect and (ii) transmits an HTTP response containing a user information acquisition request to the multifunction apparatus 21 (S42). In the HTTP response, a loopback address has been designated as a changed access destination.

The web browser section 5 recognizes that the access destination has been changed into the loopback address, in response to the HTTP response received from the information processing apparatus 51. The web browser section 5 can therefore access to inform the second web server section 8 of the user information acquisition request (S43).

Then, the second web server section 8 requests the control application section 23 to carry out a process for acquiring the user information in accordance with the user information acquisition request received from the web browser section 5 (S43).

In a case where the control application section 23 recognizes that the instruction received from the web browser section 5 is the user information acquisition request, the control application section 23 creates a control command for acquiring the user information, and then, transmits the control command to the apparatus control section 7 (S44). Note that the processes S44 through S47 are identical with the respective processes S24 through S27 described in Concrete Example 1. Their descriptions are therefore omitted here.

The control application section 23 (i) obtains the user information from the apparatus control section 7 in S47 and (ii) transmits the obtained user information to the web browser section 5 as a response to the user information acquisition request received from the web browser section 5 in S43 (S48).

Here, when responding to the request, it may be possible that, for example, (i) the control application section 23 creates the HTML data of the initial operation screen, in accordance with the user information, so as to transmit the HTML data to the web browser section 5, (ii) the web browser section 5 combines the HTML data of the initial operation screen, obtained from the control application section 23, with the HTML data of the initial operation screen, obtained from the information processing apparatus 51, and (iii) the web browser section 5 controls the display section 10 to display the initial operation screen in accordance with combined HTML data.

In this case, however, the initial operation screen displayed on the display section 10 is a mixture of (i) the initial operation screen of the HTML data received from the external application section 54 of the information processing apparatus 51 and (ii) the initial operation screen of the HTML data received from the control application section 23 of the multifunction apparatus 21. In a case where a manufacturer of the application which operates on the control application section 23 is different from that of the application which operates on the external application section 54, the applications would appear to be different from each other in that their formats of the respective initial operation screens, which are to be displayed to the user, differ from each other. This gives rise to a situation in which the initial operation screen cannot be displayed correctly. Further, in order to avoid such a situation, it is necessary for the manufacturer of the application of the control application section 23 and the manufacturer of the application of the external application section 54 to unify the format of the respective screens in advance. This prevents smooth development of such applications.

In view of the circumstances, it is preferable that the external application section 54 controls all of the operation screens of the external applications on the display section 10.

For the reasons described above, the control application section 23 responds to the web browser section 5 by (i) changing the access destination to the first web server section 53 of the information processing apparatus 51 by use of the HTTP redirect and (ii) transmitting, to the web browser section 5, the HTTP response for informing the information processing apparatus 51 of (a) a request for acquiring the initial screen information and (b) the user information (S48).

Specifically, the control application section 23 transmits, to the web browser section 5, the HTTP response employing the HTTP redirect shown, for example, in FIG. 9. For the HTTP redirect, it is possible to use HTML data in which (i) an HTTP status code of "301" or "302" is contained and (ii) the URL to which the access destination was changed is described in a Location attribute ("Location: http://123.123 . . . " in FIG. 9) (see FIG. 9).

Then, on receipt of the HTTP response shown in FIG. 9, the web browser section 5 analyzes the HTTP response so as to carry out a process in accordance with the URL designated by the location attribute. Here, the IP address contained in the URL designated by the Location attribute is set to the information processing apparatus 51. As such, the web browser section 5 transmits, to the information processing apparatus 51, the HTTP request which requires the data of the operation screen indicated by the URL (S49).

Then, the first web server section 53 of the information processing apparatus 51 responds to the multifunction apparatus 21, by transmitting the HTML data of the initial operation screen which HTML data is prepared in response to the HTTP request received from the web browser section 5 (S50). On receipt of the HTML data of the initial operation screen from the first web server section 53, the web browser section 5 controls the display section 10 to display the initial operation screen indicated by the HTML data (S51).

As described above, according to the present concrete example, the external application section 54 controls all of the operation screens of the external applications to be displayed on the display section 10. Accordingly, it becomes unnecessary to transmit the HTML data of the initial operation screen when responding to the initial operation screen transmission request received from the multifunction apparatus 21 (S42).

[Flow of Entire Cooperation Process]

Figure 10:
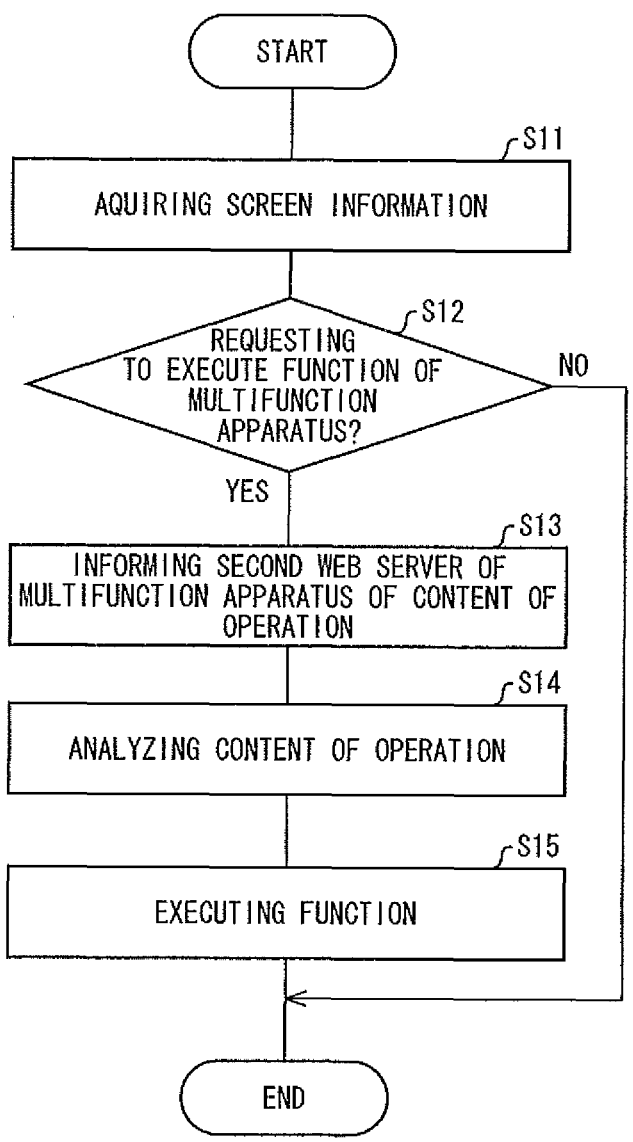
FIG. 10 is a flowchart showing how an entire cooperation process is carried out.

Next, the following description deals with a flow of an entire cooperation process in which the multifunction apparatus 21 and the information processing apparatus 51 work together, with reference to FIG. 10. FIG. 10 is a flowchart showing how the entire cooperation process is carried out.

First, in a case where the cooperation process is selected via the selection screen displayed in S6, the apparatus control section 7 controls the web browser section 5 to start up so that the web browser section 5 accesses the predetermined URL. Here, the predetermined URL is the one which requests the first web server section 53 of the information processing apparatus 51 to transmit the operation screen of the external application to the multifunction apparatus 21. Therefore, the web browser section 5 transmits, to the information processing apparatus 51 via the second communication section 22, the HTTP Get command which requests the transmission of the operation screen.

On receipt of the Get command from the multifunction apparatus 21, the first web server section 53 of the information processing apparatus 51 transmits the HTML data of the operation screen corresponding to the Get command to the multifunction apparatus 21 as the HTTP response. Then, the web browser section 5 of the multifunction apparatus 21 causes the display section 10 to display the initial operation screen indicated by the received HTML data (S11). Due to the user information acquisition process explained in the foregoing Concrete Process 1 or 2, the display section 10 displays the initial operation screen in accordance with a corresponding user at this point.

Next, the web browser section 5 analyzes the instruction entered via the input section 11 by the user so as to check whether or not the instruction contains an instruction to control any of the functions of the multifunction apparatus 21 (S12).

In a case where the instruction contains an instruction to control any of the functions of the multifunction apparatus 21 (Yes in S12), the web browser section 5 informs the second web server section that the instruction contains such an instruction (S13). That is, according to the present embodiment, the HTTP response transmitted from the information processing apparatus 51 to the multifunction apparatus is contrived so that, in a case where the multifunction apparatus 21 controls any of the functions in the cooperation process, this is informed to the second web server section 8 of the multifunction apparatus 21.

Specifically, in the HTML data of the operation screen which HTML data is to be transmitted to the multifunction apparatus 21, the external application section 54 of the information processing apparatus 51 sets the loopback address as an address to be accessed when a button, via which a function of the multifunction apparatus 21 is specified, is pressed. With the arrangement, when a button, via which a function of the multifunction apparatus 21 is specified, is pressed on the operation screen, the web browser section 5 of the multifunction apparatus 21 accesses the second web server section 8 of the multifunction apparatus 21 in accordance with the loopback address. As such, it is possible to inform the second web server section 8 of the instruction to control a function of the multifunction apparatus 21.

Alternatively, the external application section 54 of the information processing apparatus 51 sets, in the operation screen transmitted to the multifunction apparatus 21, the first web server section 53 of the information processing apparatus 51 as the access destination, which is accessed when the button, via which a function of the multifunction apparatus 21 is specified, is pressed. In this case, when the external application section 54 receives an HTTP request indicating that the button, via which the function is specified, is pressed on the operation screen, the external application section 54 transmits, by use of the HTTP redirect, to the multifunction apparatus 21, an HTTP response for changing the access destination to the second web server section 8 of the multifunction apparatus 21. This allows the web browser section 5 of the multifunction apparatus 21 to access the second web server section 8 of the multifunction apparatus 21 in accordance with the HTTP response so as to inform the second web server section 8 of the instruction to control the function of the multifunction apparatus 21.

After that, the control application section 23 which was started up by the second web server section 8 analyzes content of the control instruction received from the web browser section 5 (S14).

Then, the control application section 23 (i) creates a control command for controlling a corresponding one of the functions of the multifunction apparatus 21 on the basis of the result of the analysis and (ii) transmits the control command to the apparatus control section 7. The Open I/F section 71 of the apparatus control section 7 receives the control command, and converts the control command into a command so that the control command can be recognized by the apparatus control section 7. After that, the apparatus control section 7 controls the corresponding one of the functions of the multifunction apparatus 21 in accordance with the converted command (S15).

As described above, the multifunction apparatus control system 1 includes (i) the information processing apparatus 51 including the first web server section 53 which operates in accordance with software of the web server and (ii) the multifunction apparatus 21 which communicates with the information processing apparatus 51 via the communication network 50.

The multifunction apparatus 21 includes (i) the web browser section 5 which operates in accordance with software of the web browser and (ii) the second web server section 8 which operates in accordance with software of the web server. The web browser section 5 receives, from the first web server section 53, the control information for informing the second web server section 8 of the control command for controlling the multifunction apparatus 21. On receipt of the control information from the first web server section 53, the web browser section 5 carries out an informing process in which the web browser section 5 informs the second web server section 8 of the control command. The multifunction apparatus 21 further includes the control application section 23 and the apparatus control section 7, which control a function of the multifunction apparatus 21 in accordance with the control instruction, of which the second web server section 8 is informed by the web browser section 5.

For example, the web browser section 5 (i) controls the display section 10 to display the operation screen indicated by screen data received from the first web server section 53 and (ii) informs the second web server section 8 of a control instruction to control a corresponding function of the multifunction apparatus 21, which control instruction has been entered via the operation screen.

Alternatively, the web browser section 5 can receive, from the first web server section 53, the control information (control content) in which the control command is described in the Java (registered trademark) script so as to inform the second web server section 8 of the control command in the control information.

With the arrangement, the control application section 23 and the apparatus control section 7 can receive the control command from the second web server section 8 of the multifunction apparatus 21, not from the first web server section 53 of the information processing apparatus 51. The control application section 23, the apparatus control section 7, and the second web server section 8 are all provided in the multifunction apparatus 21. Therefore, no firewall is provided between the second web server section 8 and respective of the control application section 23 and the apparatus control section 7. As a result, even if the firewall is provided in the communication network 50 via which the multifunction apparatus 21 and the information processing apparatus 51 communicate with each other, then the information processing apparatus 51 can control the functions of the multifunction apparatus 21. Further, the information processing apparatus 51 has the screen data of the operation screen. This makes it possible to easily modify the operation screen displayed on the multifunction apparatus 21 by editing the screen data owned by the information processing apparatus 51.

As described above, according to the present embodiment, the apparatus control section 7 transmits entered login information to the authentication server 91 so as to control the authentication server 91 to carry out the authentication process. Further, when the cooperation process is carried out by the web browser section 5 and the information processing apparatus 51, the web browser section 5 (i) receives control information from the first web server section 53 and (ii) carries out the informing process in which the web browser section 5 informs the second web server section 8 of a user information acquisition request contained in the control information. Then, the web browser section 5 transmits user information received from the authentication server 91 to the first web server section 53. In this manner, according to the multifunction apparatus control system 1, the multifunction apparatus (i) obtains, from the authentication server 91, the user information which is requested by the information processing apparatus 51 and (ii) transmits the user information to the information processing apparatus 51. Therefore, it is possible for the information processing apparatus 51 to authenticate the user by use of the user information.

This makes it possible to provide a multifunction apparatus 21 which allows the user to easily carry out single sign-on without the multifunction apparatus 21 storing user information for each user, even in a case where requested user information differs between external applications.

Further, according to the arrangement, the apparatus control section 7 can receive the control instruction from the second web server section 8 of the multifunction apparatus 21, not from the first web server section 53 of the information processing apparatus 51. Since the apparatus control section 7 and the second web server section 8 are provided in a single apparatus, no firewall is provided between the apparatus control section 7 and the second web server section 8. As a result, even if a firewall is provided in the communication network 50 via which the multifunction apparatus 21 and the information processing apparatus communicate with each other, the multifunction apparatus 21 can communicate with the authentication server 91, and the information processing apparatus 51 can control a corresponding one of the functions of the multifunction apparatus 21.

Modified Example

The embodiment has dealt with the configuration where, in response to the user information acquisition request, the multifunction apparatus 21 (i) obtains, from the authentication server 91, only the user information which is necessary to log in the target external application and (ii) transmits the user information to the information processing apparatus 51. With the arrangement, the user information which is necessary to log in the external application is transmitted from the multifunction apparatus 21 to the information processing apparatus 51. This allows the user to omit the authentication process for each external application. Note, however, that the present invention is not limited to this. For example, the multifunction apparatus 21 can be configured so as to (i) obtain, from the authentication server 91, all the user information related to the login user stored in the authentication server 91 and (ii) transmit all the user information to the information processing apparatus 51.

In this case, it is preferable not to transmit specific user information to the information processing apparatus 51. For example, it is preferable to limit the user information, to be transmitted to the information processing apparatus 51, that is mainly used within the multifunction apparatus 21 such as a full name of the user. This is because it is unnecessary to transmit such specific user information to the information processing apparatus 51. This prevents the user information stored in the authentication server 91 from being unnecessarily transmitted to the information processing apparatus 51, i.e. outside the firewall.

The following description deals with the present modified example in detail with reference to FIG. 4. In S26, the apparatus control section 7 obtains all the user information related to the login user stored in the authentication server 91. Then, the apparatus control section 7 searches for specific user information designated by the user in advance out of the user information received from the authentication server 91. In a case where the user information contains the specific user information, the apparatus control section (i) stores the specific user information and (ii) transmits user information other than the specific user information to the control application section 23 (S27). In S29, the specific user information is therefore not transmitted to the external application section 54 but only the user information other than the specific user information is transmitted to the external application section 54.

Note that the user information, whose transmission to the information processing apparatus 51 is limited, is registered on a memory or the like in advance, and registered user information can be appropriately modified, if necessary.

Further, it is possible for the user to appropriately select specific user information whose transmission to the information processing apparatus 51 is limited, instead of storing such specific user information in the memory or the like. For example, the apparatus control section 7 can be configured so as to (i) control the display section 10 to display a user information selection screen via which the user can select the user information received from the authentication server 91 and (ii) transmit only the user information, selected by the user via the input section 11, to the information processing apparatus 51. Alternatively, it is possible for the apparatus control section 7 to transmit only the user information, other than the user information selected by the user, to the information processing apparatus 51. In this case, the apparatus control section 7 not via the web browser section 5 but directly controls the operational section 4 so that the display section 10 is controlled to display the user information selection screen in a superimposed manner.

As described above, according to the present modified example, the specific user information whose transmission from the multifunction apparatus 21 to the information processing apparatus 51 is limited. This prevents the user information, stored in the authentication server 91, from being unnecessarily transmitted to the information processing apparatus 51. Therefore, it is possible to reduce a security risk such as leakage of personal information.

Conclusion of Embodiment

As described above, a multifunction apparatus of the present embodiment, which communicates with, via a communication network, an information processing apparatus including a first web server section which operates in accordance with software of a web server, the multifunction apparatus working with an application which operates on the web server so as to carry out a cooperation process, includes: an authentication control section which communicates with an authentication server that (i) carries out an authentication process for authenticating a user who operates the multifunction apparatus and (ii) stores, for each user, user related information which is related to the each user and is used when the multifunction apparatus carries out the cooperation process with the application; a second web server section which operates in accordance with software of the web server; and a web browser section which communicates with the first web server section or the second web server section in accordance with software of a web browser, the authentication control section (i) controlling the authentication server to carry out the authentication process by transmitting login information, entered by a user, to the authentication server and (ii) storing the login information, the web browser section (i) accepting, from the first web server section, control information for informing the second web server section of a control instruction to obtain the user related information from the authentication server and (ii) carrying out an informing process, in which the second web server section is informed of the control instruction, on receipt of the control information from the first web server section, the authentication control section obtaining, from the authentication server, the user related information in accordance with the control instruction received by the second web server section, the user related information corresponding to the user indicated by the login information stored in the authentication control section, and the web browser section transmitting the user related information obtained by the authentication control section to the first web server section.

According to the arrangement, the authentication control section controls the authentication server to carry out the authentication process by transmitting the entered login information to the authentication server. Further, when the cooperation process is carried out, the web browser section (i) accepts, from the first web server section, the control information contains the control instruction to obtain the user related information from the authentication server and (ii) carries out the informing process in which the second web server section is informed of the control instruction. Then, the web browser section transmits the user related information obtained from the authentication server to the first web server section. According to the arrangement, the multifunction apparatus 21 (i) obtains the user related information requested by the first web server section from the authentication server and (ii) transmits the user related information to the first web server section in response to the request. Therefore, the information processing apparatus can authenticate the user by use of the user related information.

This makes it possible to provide a multifunction apparatus which allows a user to easily execute single sign-on without multifunction apparatus storing user information for each user, even in a case where requested user information differs between external applications.

Further, according to the arrangement, the authentication control section can receive the control instruction from the second web server section of the multifunction apparatus, instead of receiving it from the first web server section of the information processing apparatus. Since the authentication control section and the second web server section are provided in the same multifunction apparatus, no firewall is provided between the authentication control section and the second web server section. Accordingly, even if the firewall is provided in the communication network via which the multifunction apparatus and the information processing apparatus communicate with each other, (i) the multifunction apparatus can communicate with the authentication server and (ii) the information processing apparatus can control the corresponding one of the functions of the multifunction apparatus.

Further, the multifunction apparatus of the present embodiment, preferably further includes a display section, in the informing process, the web browser section (i) transmitting, to the first web server section, an HTTP request which requires an operation screen via which the cooperation process is carried out, (ii), in response to the HTTP request, receiving from the first web server section a first HTTP response which contains (a) the control instruction and (b) a script for accessing the second web server section, the script being carried out before the display section displays a screen indicated by the data of the operation screen, and then (iii) accessing the second web server section in accordance with the first HTTP response so as to inform the second web server section of the control instruction.

According to the arrangement, the web browser section (i) receives, from the first web server section, the first HTTP response that contains the control instruction and the script for accessing the second web server section and (ii) accesses the second web server section in accordance with the first HTTP response before the display section displays the screen indicated by the data of the operation screen, so as to inform the second web server section of the control instruction.

This makes it possible to cause an operation screen to be displayed in accordance with a user without requiring user's operation.

Further, the multifunction apparatus of the present embodiment may be preferably arranged such that, in the informing process, the web browser section (i) transmits, to the first web server section, an HTTP request which requires an operation screen via which the cooperation process is carried out, (ii), in response to the HTTP request, receives from the first web server section a first HTTP response which contains (a) the control instruction and (b) an instruction to change an access destination to the second web server section by use of an HTTP redirect, and then (iii) accesses the second web server section in accordance with the first HTTP response so as to inform the second web server section of the control instruction.

According to the arrangement, the web browser section (i) receives, from the first web server section, the first HTTP response containing the control instruction and the instruction to change the access destination to the second web server section by use of the HTTP redirect and (ii) informs the second web server section of the control instruction by accessing the second web server section.

This makes it possible to cause the operation screen to be displayed in accordance with the user without requiring the user's operation.

Further, the multifunction apparatus of the present embodiment, preferably further includes a display section, the authentication control section transmitting, to the second web server section, the user related information obtained from the authentication server, in response to the control instruction, the second web server section transmitting, to the web browser section, a second HTTP response which contains (i) the user related information received from the authentication control section and (ii) an instruction to change an access destination to the second web server section by use of an HTTP redirect, and the web browser section (i) informing the first web server section of the user related information contained in the second HTTP response and requests the first web server section to transmit data of an operation screen via which the cooperation process is carried out, (ii) obtaining the data of the operation screen, prepared in accordance with the user related information, from the first web server section, then (iii) controlling the display section to display the operation screen indicated by the data of the operation screen.

According to the arrangement, as the response to the control instruction, the second web server section transmits, to the web browser section, the second HTTP response which contains the user related information, obtained from the authentication control section, and the instruction to change the access destination to the second web server section by use of the HTTP redirect. Then, the web browser section informs the first web server section of the user related information contained in the second HTTP response and requests the first web server section to transmit data of the operation screen via which the cooperation process is carried out. Therefore, the web browser section obtains the data of the operation screen based on the user related information from the first web server section, and controls the display section to display the operation screen indicated by the data of the operation screen.

As described above, the web browser section controls the display section to display only the operation screen obtained from the first web server section. Therefore, it is possible to control all of the operation screens to be displayed on the display section on the information processing apparatus side.

Further, the multifunction apparatus of the present embodiment may be preferably arranged such that the authentication control section searches for predetermined specific user related information out of the user related information obtained from the authentication server, and the web browser section transmits, to the first web server section, user related information other than the specific user related information out of said user related information.

According to the arrangement, the authentication control section searches for the predetermined specific user related information out of the user related information, obtained from the authentication server, and the web browser section transmits, to the first web server section, the user related information other than the specific user related information. Therefore, the specific user related information determined by the input entered by the user is not transmitted from the multifunction apparatus to the information processing apparatus but can be used in the multifunction apparatus.

This prevents the user related information from being unnecessarily transmitted to the information processing apparatus. Therefore, it becomes possible to reduce a security risk such as leakage of personal information.

Further, the multifunction apparatus of the present embodiment may be preferably arranged such that the authentication control section determines, in accordance with an input of the user, specific user related information out of the user related information obtained from the authentication server, and the web browser section transmits, to the first web server section, user related information other than the specific user related information out of said user related information.

According to the arrangement, the authentication control section determines, in accordance with an input of the user, the specific user related information out of the user related information obtained from the authentication server, and the web browser section transmits the user related information other than the specific user related information to the first web server section. Therefore, the specific user related information determined by the input entered by the user is not transmitted from the multifunction apparatus to the information processing apparatus but used in the multifunction apparatus.

This prevents the user related information from being unnecessarily transmitted to the information processing apparatus. Therefore, it becomes possible to reduce the security risk such as leakage of personal information.

Further, the authentication server of the present embodiment, which communicates with the multifunction apparatus, so as to carry out an authentication process for authenticating a user who operates the multifunction apparatus, includes: a user related information storage section for storing, for each user, user related information which is related to the each user and is used when the multifunction apparatus carries out a cooperation process with the application; and a user related information transmission section for (i) reading out, from the user related information storage section, user related information requested by the authentication control section and (ii) transmitting, to the multifunction apparatus, the user related information requested by the authentication control section.

According to the arrangement, it is possible to provide an authentication server which allows a user to easily execute single sing-on without the multifunction apparatus storing, for each user, user information, even if requested user information differs between external applications.

Further, a multifunction apparatus control system of the present embodiment preferably includes the multifunction apparatus and authentication server which communicates with the multifunction apparatus.

According to the arrangement, it is possible to provide a multifunction apparatus control system which allows a user to easily execute single sign-on without the multifunction apparatus storing user information for each user, even if requested user information differs between external applications.

Note that the multifunction apparatus and the authentication server can be realized by a computer. In this case, the scope of the present invention encompass a program for realizing the multifunction apparatus on the computer by causing the computer to function as each of the sections of the multifunction apparatus, and a computer-readable storage medium in which the program is stored.

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each of the blocks of the multifunction apparatus 21, the authentication server 91, and the information processing apparatus 51 can be realized by a hardware logic or by software by use of a CPU (Central Processing Unit) as described below.

That is, each of the multifunction apparatus 21, the authentication server 91, and the information processing apparatus 51 includes: the CPU (central processing unit) which executes an instruction of a control program realizing each of the functions described above; a ROM (read only memory) in which the program is stored; a RAM (random access memory) which develops the program; a storage device (storage medium), such as a memory, in which the program and various kinds of data are stored; and the like. Further, the object of the present invention can be achieved in the following manner: (i) a storage medium for computer-readably storing a program code (an execute form program, intermediate code program, or source program), which is software for implementing the aforementioned functions, is provided to the multifunction apparatus 21, the authentication server 91, and the information processing apparatus 51, and (ii) a computer (or a CPU or a MPU (Microprocessor Unit)) of each of the multifunction apparatus 1 and the authentication server 2 reads out the program code stored in the storage medium so as to execute the program.

Examples of the storage medium encompass: tapes, such as magnetic tapes and cassette tapes; disks including magnetic disks, such as floppy disks (registered trademark) and hard disks, and optical disks, such as CD-ROMs (Compact Disc Read-Only Memories), MOs (Magnetic Optical Disks), MDs (mini disks), DVDs (digital video disks), and CD-Rs (CD Recordable); cards, such as IC cards (including memory cards) and optical cards; and semiconductor memories, such as mask ROMs, EPROMs (Erasable Programmable Read-Only Memory), EEPROMs (Electrically Erasable and Programmable Read-Only Memory), and flash ROMs.

Further, each of the multifunction apparatus 21, the authentication server 91, and the information processing apparatus 51 can be made connectable to a communication network, and the program code can be supplied via the communication network. The communication networks are not limited to specific means. Examples of the communication network encompass the Internet, an intranet, an extranet, a LAN (Local Area Network), an ISDN (Integrated Services Digital Network), a VAN (Value-Added Network), a CATV (Community Antenna Television) communication network, a virtual private network, a telephone line network, a mobile communication network, a satellite communication network, and the like. Furthermore, a transmission medium constituting the communication network is not particularly limited. Specifically, it is possible to use a wired line such as a line in compliance with an IEEE (Institute of Electrical and Electronic Engineers) 1394 standard, a USB line, a power line, a cable TV line, a telephone line, an ADSL (Asynchronous Digital Subscriber Loop) line, and the like, as the transmission medium. Moreover, it is possible to use (i) a wireless line utilizing an infrared ray used in IrDA (Infrared Data Association) and a remote controller, (ii) a wireless line which is in compliance with a Bluetooth standard (registered trademark) or an IEEE802.11 wireless standard, and (iii) a wireless line utilizing an HDR (High Data Rate), a mobile phone network, a satellite line, a terrestrial digital network, and the like, as the transmission medium. Note that, the present invention can be realized by a computer data signal which is realized by electronic transmission of the program code and which is embedded in a carrier wave.

INDUSTRIAL APPLICABILITY

The present invention is applicable to a multifunction apparatus which can carry out a plurality of functions such as a copying function, a scanning function, and a facsimile sending/receiving function.

REFERENCE SIGNS LIST

1: Multifunction apparatus control system
2: Image scanning section
3: Image forming section
4: Operational section
5: Web browser section
7: Apparatus control section (authentication control section)
8: Second web server section
10: Display section
11: Input section
21: Multifunction apparatus
22: Second communication section
23: Control application section (control section)
50: Communication network
51: Information processing apparatus
52: First communication section
53: First web server section
54: External application section
71: Open I/F section
91: Authentication server
92: User information storage section (user related information storage section)
93: User information management section (user authentication section)
94: Third communication section (user related information sending section)

The invention claimed is:

1. A multifunction apparatus which communicates with, via a communication network, an information processing apparatus including a first web server section which operates in accordance with software of a web server, the multifunction apparatus working with an application which operates on the web server so as to carry out a cooperation process, comprising:
a central processing unit (CPU);
an authentication control section which communicates with an authentication server that (i) carries out an authentication process for authenticating a user who operates the multifunction apparatus and (ii) stores, for each user, user related information which is related to the each user and is used when the multifunction apparatus carries out the cooperation process with the application;

a second web server section which operates in accordance with software of the web server; and a web browser section which communicates with the first web server section or the second web server section in accordance with software of a web browser, the authentication control section (i) controlling the authentication server to carry out the authentication process by transmitting login information, entered by a user, to the authentication server and (ii) storing the login information, the web browser section (i) accepting, from the first web server section, control information for informing the second web server section of a control instruction to obtain the user related information from the authentication server and (ii) carrying out an informing process, in which the second web server section is informed of the control instruction, on receipt of the control information from the first web server section, the authentication control section obtaining, from the authentication server, the user related information in accordance with the control instruction received by the second web server section, the user related information corresponding to the user indicated by the login information stored in the authentication control section, and the web browser section transmitting the user related information obtained by the authentication control section to the first web server section, and the multifunction apparatus and the authentication server being inside a firewall, and the information processing apparatus being outside the firewall.

2. The multifunction apparatus as set forth in claim 1, further comprising:

a display section, in the informing process, the web browser section (i) transmitting, to the first web server section, an HTTP request which requires an operation screen via which the cooperation process is carried out, (ii), in response to the HTTP request, receiving from the first web server section a first HTTP response which contains (a) the control instruction and (b) a script for accessing the second web server section, the script being carried out before the display section displays a screen indicated by the data of the operation screen, and then (iii) accessing the second web server section in accordance with the first HTTP response so as to inform the second web server section of the control instruction.

3. The multifunction apparatus as set forth in claim 1, wherein:

in the informing process, the web browser section (i) transmits, to the first web server section, an HTTP request which requires an operation screen via which the cooperation process is carried out, (ii), in response to the HTTP request, receives from the first web server section a first HTTP response which contains (a) the control instruction and (b) an instruction to change an access destination to the second web server section by use of an HTTP redirect, and then (iii) accesses the second web server section in accordance with the first HTTP response so as to inform the second web server section of the control instruction.

4. The multifunction apparatus as set forth in claim 1, further comprising:

a display section, the authentication control section transmitting, to the second web server section, the user related information obtained from the authentication server, in response to the control instruction, the second web server section transmitting, to the web browser section, a second HTTP response which contains (i) the user related information received from the authentication control section and (ii) an instruction to change an access destination to the second web server section by use of an HTTP redirect, and the web browser section (i) informing the first web server section of the user related information contained in the second HTTP response and requests the first web server section to transmit data of an operation screen via which the cooperation process is carried out, (ii) obtaining the data of the operation screen, prepared in accordance with the user related information, from the first web server section, then (iii) controlling the display section to display the operation screen indicated by the data of the operation screen.

5. The multifunction apparatus as set forth in claim 1, wherein:

the authentication control section searches for predetermined specific user related information out of the user related information obtained from the authentication server; and the web browser section transmits, to the first web server section, user related information other than the specific user related information out of said user related information.

6. The multifunction apparatus as set forth in claim 1, wherein:

the authentication control section determines, in accordance with an input of the user, specific user related information out of the user related information obtained from the authentication server; and the web browser section transmits, to the first web server section, user related information other than the specific user related information out of said user related information.

7. An authentication server, which communicates with a multifunction apparatus recited in claim 1, so as to carry out an authentication process for authenticating a user who operates the multifunction apparatus, comprising:

a user related information storage section for storing, for each user, user related information which is related to the each user and is used when the multifunction apparatus carries out a cooperation process with the application; and a user related information transmission section for (i) reading out, from the user related information storage section, user related information requested by the authentication control section and (ii) transmitting, to the multifunction apparatus, the user related information requested by the authentication control section.

8. A multifunction apparatus control system comprising:

a multifunction apparatus which communicates with, via a communication network, an information processing apparatus including a first web server section which operates in accordance with software of a web server, the multifunction apparatus working with an application which operates on the web server so as to carry out a cooperation process; and an authentication server which communicates with the multifunction apparatus so as to carry out an authentication process for authenticating a user who operates the multifunction apparatus, the multifunction apparatus including:

an authentication control section which communicates with an authentication server that (i) carries out an authentication process for authenticating a user who operates the multifunction apparatus and (ii) stores, for each user, user related information which is related to the each user and is used when the multifunction apparatus carries out the cooperation process with the application;

a second web server section which operates in accordance with software of the web server; and a web browser section which communicates with the first web server section or the second web server section in accordance with software of a web browser, the authentication control section (i) controlling the authentication server to carry out the authentication process by transmitting login information, entered by a user, to the authentication server and (ii) storing the login information, the web browser section (i) accepting, from the first web server section, control information for informing the second web server section of a control instruction to obtain the user related information from the authentication server and (ii) carrying out an informing process, in which the second web server section is informed of the control instruction, on receipt of the control information from the first web server section, the authentication control section obtaining, from the authentication server, the user related information in accordance with the control instruction received by the second web server section, the user related information corresponding to the user indicated by the login information stored in the authentication control section, and the web browser section transmitting the user related information obtained by the authentication control section to the first web server section;

the authentication server including:

a user related information storage section for storing, for each user, the user related information which is related to the each user and is used when the multifunction apparatus carries out the cooperation process with the application; and a user related information transmission section for (i) reading out, from the user related information storage section, user related information requested by the authentication control section and (ii) transmitting, to the multifunction apparatus, the user related information requested by the authentication control section;

the multifunction apparatus and the authentication server being inside a firewall, and the information processing apparatus being outside the firewall.

9. A non-transitory computer-readable storage medium in which a program is stored, the program causing a computer to function as each of said sections of a multifunction apparatus recited in claim 1.

10. The non-transitory computer-readable storage medium of claim 9 in which a second program is stored, the second program causing a computer to function as each of said sections of an authentication server which communicates with the multifunction apparatus, so as to carry out an authentication process for authenticating a user who operates the multifunction apparatus, comprising:

a user related information storage section for storing, for each user, user related information which is related to the each user and is used when the multifunction apparatus carries out a cooperation process with the application; and a user related information transmission section for (i) reading out, from the user related information storage section, user related information requested by the authentication control section and (ii) transmitting, to the multifunction apparatus, the user related information requested by the authentication control section.

* * * * *